United States Patent
Yamamoto et al.

(10) Patent No.: US 9,809,721 B2
(45) Date of Patent: Nov. 7, 2017

(54) AQUEOUS INK, INK CARTRIDGE, AND INK JET RECORDING METHOD

(71) Applicant: CANON KABUSHIKI KAISHA, Tokyo (JP)

(72) Inventors: Masashi Yamamoto, Tokyo (JP); Hiroshi Kakikawa, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/993,312

(22) Filed: Jan. 12, 2016

(65) Prior Publication Data

US 2016/0215152 A1 Jul. 28, 2016

(30) Foreign Application Priority Data

Jan. 23, 2015 (JP) .................................. 2015-011094

(51) Int. Cl.
| | | |
|---|---|---|
| *C09D 11/107* | (2014.01) | |
| *C09D 11/38* | (2014.01) | |
| *C09D 11/10* | (2014.01) | |
| *C09D 11/322* | (2014.01) | |

(52) U.S. Cl.
CPC ............ *C09D 11/107* (2013.01); *C09D 11/10* (2013.01); *C09D 11/322* (2013.01); *C09D 11/38* (2013.01)

(58) Field of Classification Search
None
See application file for complete search history.

(56) References Cited

U.S. PATENT DOCUMENTS

| | | | |
|---|---|---|---|
| 4,756,963 | A | 7/1988 | Yamamoto et al. |
| 4,780,348 | A | 10/1988 | Yamamato et al. |
| 5,082,496 | A | 1/1992 | Yamamoto et al. |
| 5,123,960 | A | 6/1992 | Shirota et al. |

(Continued)

FOREIGN PATENT DOCUMENTS

| | | |
|---|---|---|
| JP | 2008-266363 A | 11/2008 |
| JP | 2010-275377 A | 12/2010 |

(Continued)

OTHER PUBLICATIONS

Apr. 25, 2016 European Search Report in European Patent Appln. No. 16000055.0.

*Primary Examiner* — Matthew Luu
*Assistant Examiner* — Renee I Wilson
(74) *Attorney, Agent, or Firm* — Fitzpatrick, Cella, Harper & Scinto

(57) ABSTRACT

An aqueous ink for ink jet including a pigment; a water-soluble resin for dispersing the pigment; a water-soluble organic solvent; an acetyleneglycol type surfactant; and a fluorinated surfactant. The acetyleneglycol type surfactant includes an acetyleneglycol ethylene oxide adduct having an HLB value determined by Griffin's method of 10 or more. The fluorinated surfactant includes a perfluoroalkyl ethylene oxide adduct having a perfluoroalkyl group with six or less carbon atoms. The water-soluble organic solvent has a dielectric constant at 25° C. of 20.0-30.0. The content of the water-soluble organic solvent relative to the content of the fluorinated surfactant based on the total mass of the ink is 100-200 times in terms of mass ratio. The aqueous ink has a dynamic surface tension $\gamma_{10}$ at a lifetime of 10 ms of 40 mN/m or less and a static surface tension $\gamma$ of 25 mN/m or more.

18 Claims, 2 Drawing Sheets

(56) References Cited

U.S. PATENT DOCUMENTS

| | | |
|---|---|---|
| 5,127,946 A | 7/1992 | Eida et al. |
| 5,130,723 A | 7/1992 | Yamamoto et al. |
| 5,167,703 A | 12/1992 | Eida et al. |
| 5,178,671 A | 1/1993 | Yamamoto et al. |
| 5,213,614 A | 5/1993 | Eida et al. |
| 5,215,577 A | 6/1993 | Eida et al. |
| 5,215,578 A | 6/1993 | Eida et al. |
| 5,258,505 A | 11/1993 | Eida et al. |
| 5,415,686 A | 5/1995 | Kurabayashi et al. |
| 5,451,251 A | 9/1995 | Mafune et al. |
| 5,482,545 A | 1/1996 | Aoki et al. |
| 5,571,313 A | 11/1996 | Mafune et al. |
| 5,728,201 A | 3/1998 | Saito et al. |
| 5,911,815 A | 6/1999 | Yamamoto et al. |
| 6,003,987 A | 12/1999 | Yamamoto et al. |
| 6,007,182 A | 12/1999 | Matsubara et al. |
| 6,027,210 A | 2/2000 | Kurabayashi et al. |
| 6,062,674 A | 5/2000 | Inui et al. |
| 6,174,354 B1 | 1/2001 | Takizawa et al. |
| 6,186,615 B1 | 2/2001 | Sato et al. |
| 6,281,917 B1 | 8/2001 | Katsuragi et al. |
| 8,236,096 B2 * | 8/2012 | Sakai .................. C09D 11/322 106/31.6 |
| 8,651,651 B2 | 2/2014 | Takaku et al. |
| 8,876,962 B2 | 11/2014 | Yamamoto et al. |
| 8,992,676 B2 | 3/2015 | Yamashita et al. |
| 9,187,662 B2 | 11/2015 | Yamamoto et al. |
| 2007/0120928 A1 | 5/2007 | Ma et al. |
| 2007/0126839 A1 | 6/2007 | Kelly-Rowley et al. |
| 2007/0225400 A1 | 9/2007 | Schmid et al. |
| 2011/0234689 A1 | 9/2011 | Saito |
| 2012/0262517 A1 | 10/2012 | Takaku et al. |
| 2013/0063518 A1 * | 3/2013 | Takebayashi ........ C09D 11/322 347/20 |
| 2013/0183501 A1 | 7/2013 | Kasperchik et al. |
| 2013/0328973 A1 | 12/2013 | Kakikawa et al. |
| 2013/0342604 A1 | 12/2013 | Yamashita et al. |
| 2014/0364548 A1 * | 12/2014 | Everhardus .......... C09D 11/322 524/166 |
| 2015/0267067 A1 * | 9/2015 | Ueki ...................... C09D 11/10 347/20 |
| 2016/0023456 A1 * | 1/2016 | Yoneyama ................ B41J 2/01 347/20 |

FOREIGN PATENT DOCUMENTS

| | | |
|---|---|---|
| JP | 2011-137122 A | 7/2011 |
| JP | 2012-184376 A | 9/2012 |
| JP | 2012-224658 A | 11/2012 |
| JP | 2014-025055 A | 2/2014 |
| WO | 2013/131924 A1 | 9/2013 |

* cited by examiner

AQUEOUS INK, INK CARTRIDGE, AND INK JET RECORDING METHOD

BACKGROUND OF THE INVENTION

Field of the Invention

The present invention relates to an aqueous ink, an ink cartridge, and an ink jet recording method.

Description of the Related Art

In recent years, inks containing pigments (pigment inks) as coloring materials have been widely used as an ink used for an ink jet recording method. In order to give glossy images such as photographs, an ink containing a resin-dispersed pigment in which a pigment is dispersed by a resin (resin dispersant) is typically used. If the ink containing the resin-dispersed pigment is used, highly tough images can be recorded because the pigment is present in the form of particles in the ink. However, the images recorded with the pigment inks unfortunately have lower gloss clarity than those of images recorded with dye inks in which dyes are dissolved in an aqueous medium. The "gloss clarity" is an indicator of the characteristics commonly used for evaluating glossy images and an indicator of clearness and distinctness of an image recorded on the surface of a recording medium.

To solve that problem, various techniques have been disclosed. In one of the techniques, a silicone-containing surfactant or a fluorinated surfactant is added to lower the surface tension of an ink, and thus the wettability and the permeability of the ink with respect to a recording medium is improved. For example, an ink containing a silicone-containing surfactant or a fluorinated surfactant (Japanese Patent Application Laid-Open No. 2012-184376) and an ink that is so adjusted that the surface tension before evaporation is larger than the surface tension after evaporation (Japanese Patent Application Laid-Open No. 2012-224658) have been disclosed. Moreover, an ink in which the change in dynamic surface tension of the ink is specified has been disclosed (Japanese Patent Application Laid-Open No. 2014-025055). In addition, an ink containing a fluorinated surfactant and a foam suppressor has been disclosed (Japanese Patent Application Laid-Open No. 2010-275377).

The result of the study by the inventors of the present invention, however, has revealed that when the ink disclosed in Japanese Patent Application Laid-Open No. 2012-184376, Japanese Patent Application Laid-Open No. 2012-224658, or Japanese Patent Application Laid-Open No. 2014-025055 is used to record images on recording mediums such as glossy paper, the gloss clarity of images may be improved depending on the constitution of inks, but the gloss clarity of images deteriorates in many cases. The result has also revealed that even when the ink capable of improving the gloss clarity of images is used, the difference in gloss is large between a high density area and a low density area (i.e., gloss unevenness is conspicuous). In other words, with regard to the improvement of gloss clarity and the suppression of gloss unevenness, images satisfying recently demanded high quality cannot be recorded. The ink disclosed in Japanese Patent Application Laid-Open No. 2010-275377 gives conspicuous gloss unevenness and cannot produce satisfactory images.

An object of the present invention is to provide an aqueous ink capable of performing recording of images having excellent gloss clarity and small gloss unevenness. Another object of the present invention is to provide an ink cartridge and an ink jet recording method using the aqueous ink.

SUMMARY OF THE INVENTION

The above object is achieved by the following present invention. The present invention provides an aqueous ink for ink jet including a pigment, a water-soluble resin for dispersing the pigment, a water-soluble organic solvent, an acetyleneglycol type surfactant, and a fluorinated surfactant. In the aqueous ink, the acetyleneglycol type surfactant is an acetyleneglycol ethylene oxide adduct having an HLB value determined by Griffin's method of 10 or more; the fluorinated surfactant is a perfluoroalkyl ethylene oxide adduct having a perfluoroalkyl group with six or less carbon atoms; the water-soluble organic solvent has a dielectric constant at 25° C. of 20.0 or more to 30.0 or less; a content (% by mass) of the water-soluble organic solvent relative to a content (% by mass) of the fluorinated surfactant based on the total mass of the ink is 100 times or more to 200 times or less in terms of mass ratio; and the aqueous ink has a dynamic surface tension $\gamma_{10}$ at a lifetime of 10 ms of 40 mN/m or less and a static surface tension $\gamma$ of 25 mN/m or more.

According to the present invention, an aqueous ink capable of performing recording of images having excellent gloss clarity and small gloss unevenness can be provided. According to the present invention, an ink cartridge and an ink jet recording method using the aqueous ink can also be provided.

Further features of the present invention will become apparent from the following description of exemplary embodiments with reference to the attached drawings.

BRIEF DESCRIPTION OF THE DRAWINGS

FIG. 2A is a perspective view of a principal part of the ink jet recording apparatus; and FIG. 2B is a perspective view of a head cartridge.

DESCRIPTION OF THE EMBODIMENTS

Figure 1:
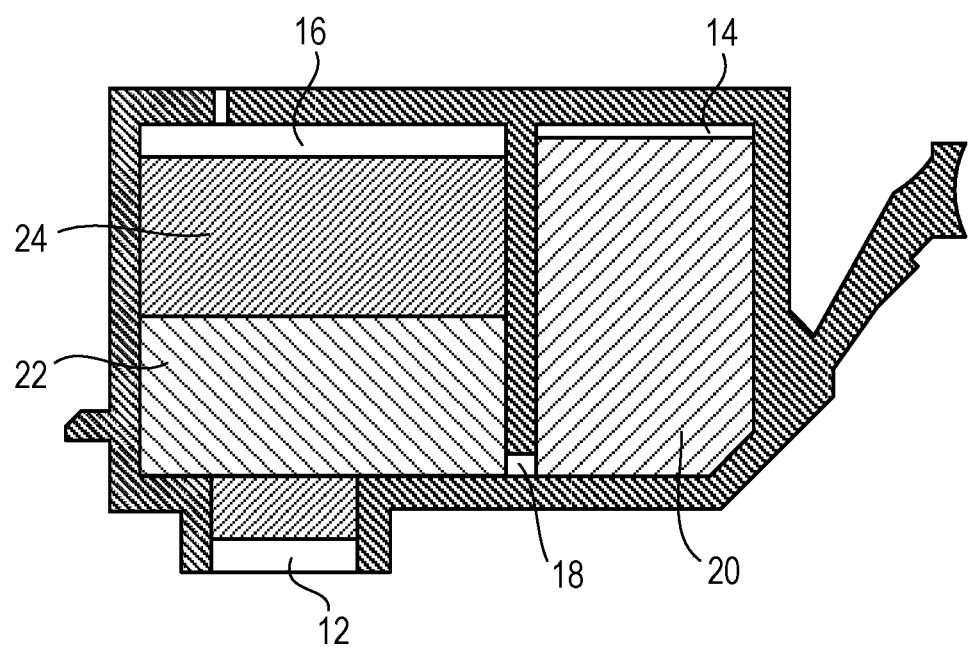
FIG. 1 is a schematic sectional view illustrating an ink cartridge according to an embodiment of the present invention.

Preferred embodiments of the present invention will now be described in detail in accordance with the accompanying drawings.

The present invention will now be described in detail with reference to preferred embodiments. An aqueous ink for ink jet is also simply called "ink". Various physical property values in the present invention are the values determined at 25° C. unless otherwise noted.

To record images having excellent gloss clarity by using pigment inks, both the wettability and the permeability of the inks with respect to a recording medium are required to be improved. It is generally understood that both the wettability and the permeability can be improved by reducing the surface tension of an ink. Hence, in order to improve the gloss clarity, the inventors of the present invention have added a silicone-containing surfactant to an ink containing a resin-dispersed pigment to reduce the surface tension and have tried to improve the wettability and the permeability of the ink with respect to a recording medium. Contrary to our expectations, the gloss clarity of images recorded by using the ink containing the silicone-containing surfactant deteriorates. The analysis result has revealed that the reason is because the permeation rate of the ink into a recording medium is lower than expected.

The permeation rate of an ink into a recording medium depends on the capillary force of the ink with respect to pores in a recording medium or gaps in a pigment layer formed. The capillary force of an ink becomes small as the ink has a lower surface tension, whereas the capillary force becomes large as the contact angle between a capillary and the ink becomes small. However, the contact angle between a capillary and an ink also depends on the surface tension, and the contact angle becomes small as the surface tension becomes small. In other words, the capillary force is determined by the balance of the surface tension itself of an ink and the contact angle between the ink and a capillary. Typically, the permeation rate of an ink into a recording medium improves as the ink has a lower surface tension. However, in such an extremely low surface tension region that the surface tension is reduced by adding a silicone-containing surfactant, if the surface tension is excessively reduced, the capillary force decreases conversely. As a result, the permeation rate is supposed to decrease.

A further study has been performed and has revealed that an ink having a static surface tension of less than 25 mN/m has a lower permeation rate into a recording medium, and the gloss clarity of images fall to an unsatisfactory level. The inventors of the present invention have thus supposed that an ink having such a permeation rate as to enable recording of images having higher gloss clarity can be obtained by adjusting the static surface tension of the ink to 25 mN/m or more.

However, when images were recorded by using inks adjusted to have a static surface tension of 25 mN/m or more by adding various silicone-containing surfactants, the gloss clarity was not improved in some cases. As a result of analysis, each ink had a satisfactory permeation rate. However, it has been revealed that the inks that fail to improve the gloss clarity of images have low wettability to a recording medium immediately after adhesion, thus dots do not spread, and a smooth pigment layer is not formed in some cases. As described above, an ink having a lower surface tension has higher wettability to a recording medium. However, it has been revealed as above that although having a lower static surface tension than that of conventional inks, some inks have low wettability. To address this, the inventors have carried out an analysis focusing on the dynamic surface tension of an ink. As a result, the inventors have found that the time from the adhesion of an ink onto a recording medium to the complete spread of the ink is about 10 milliseconds. It has also been found that the ink that is adjusted to have a static surface tension of 25 mN/m or more but fails to give images having excellent gloss clarity has an unexpectedly high dynamic surface tension for 10 milliseconds.

The dynamic surface tension is a surface tension of a liquid in a moving state and thus is considered to have a relation to the orientation speed of surfactant molecules in an ink toward a freshly formed interface. In addition, it is generally understood that the orientation of surfactant molecules toward a gas-liquid interface is higher as the surfactant has higher hydrophobicity. Thus, inks adjusted to have a lower dynamic surface tension at a lifetime of 10 ms by adding silicone-containing surfactants having various hydrophobicity have been studied. The result has revealed that by using an ink having a dynamic surface tension $\gamma_{10}$ at a lifetime of 10 ms of 40 mN/m or less, the wettability to a recording medium immediately after adhesion can be secured. The result has also revealed that by using an ink that contains a resin-dispersed pigment and is adjusted to have a dynamic surface tension $\gamma_{10}$ of 40 mN/m or less and a static surface tension of 25 mN/m or more by adding a silicone-containing surfactant, the gloss clarity of images are improved.

However, images having high gloss clarity have such a new problem that the difference in glossiness between an area where a large amount of an ink is applied and an area where a small amount of an ink is applied, that is, gloss unevenness, is conspicuous. The analysis result of the gloss unevenness has revealed that almost no resin dispersant is left in an area where a small amount of an ink is applied to form a thin pigment layer, whereas the resin dispersant is left in an area where a large amount of an ink is applied to form a thick pigment layer. In other words, it has been revealed that the difference in residual amount of the resin in pigment layers leads to the difference in glossiness between an area where a large amount of an ink is applied and an area where a small amount of an ink is applied, and the difference is observed as the gloss unevenness.

The inventors of the present invention suppose that the residual amount of a resin in a pigment layer varies depending on the application amount of an ink by the following mechanism. Typically, when a surfactant is added to an ink containing a resin-dispersed pigment, the adsorption exchange between the resin dispersant and the surfactant is caused on the particle surface of the pigment in some cases. In other words, it is supposed that when a surfactant is added, the resin dispersant is likely to be released from the particle surface of a pigment, and thus the resin dispersant sinks in a recording medium during the ink permeation into the recording medium. In an area where a small amount of an ink is applied, the pigment layer formed by the ink that has been applied to a recording medium is not present in many cases, and the ink adheres directly to the recording medium and permeates the recording medium. Thus, the resin dispersant sinks and is unlikely to be left in the pigment layer. Meanwhile, in an area where a large amount of an ink is applied, the ink adheres to the pigment layer formed by the ink that has been applied to a recording medium and permeates the pigment layer. Accordingly, the pigment layer gives a filling function, and the resin dispersant is left in the pigment layer. As a result of such a difference, the gloss unevenness is supposed to be caused.

On this account, the inventors of the present invention have focused on the adsorption exchange between a resin dispersant and a surfactant in order to suppress the occurrence of gloss unevenness and have studied the addition of a fluorinated surfactant in place of the silicone-containing surfactant. The fluorinated surfactant has high surface activating ability, like the silicone-containing surfactant, and thus is known as a surfactant suited for reducing the surface tension of inks. These surfactants exhibit high surface activating ability due to a large difference in hydrophilicity between a hydrophobic moiety and a hydrophilic moiety. Hence, a surfactant having high surface activating ability has a hydrophobic group having extremely high hydrophobicity and thus is likely to be adsorbed onto the particle surface of a pigment due to hydrophobic interaction.

The fluorinated surfactant very strongly attracts electrons due to high electronegativity of a fluorine atom, and thus the hydrophobic group has very week intermolecular force. Even when adsorbed onto the particle surface of a pigment, the fluorinated surfactant is easily released. On this account, as compared with other surfactants exhibiting high surface activating ability, if a fluorinated surfactant is used, the state in which a resin dispersant is not released from the particle surface of a pigment is likely to be maintained. Accordingly, the resin dispersant is left in a pigment layer even in an area where a small amount of an ink is applied, and the occurrence of gloss unevenness can be reduced. Specifically, a nonionic fluorinated surfactant having a group with a small number of carbon atoms and having a fluorine atom added is supposed to be unlikely to be adsorbed particularly to the particle surface of a pigment.

As described above, the fluorine atom very strongly attracts electrons, and thus the van der Waals force due to the fluctuation of electrons is unlikely to be generated. On this account, fluorinated compounds such as fluorinated surfactants have weak intermolecular force. In addition, a nonionic fluorinated surfactant does not ionize in an aqueous medium and thus electrons are particularly unlikely to fluctuate. In contrast, the hydrophilic group of an ionic fluorinated surfactant ionizes in an aqueous medium and thus electrons are likely to fluctuate. On this account, the ionic fluorinated surfactant has higher intermolecular force and thus is likely to be adsorbed onto the particle surface of a pigment. In addition, a surfactant is adsorbed onto the particle surface of a pigment due to the hydrophobic interaction, and thus a fluorinated surfactant having a group with a small number of carbon atoms and having a fluorine atom added and having comparatively weak hydrophobicity is further unlikely to be adsorbed onto the particle surface of a pigment. The aqueous ink of the present invention contains a perfluoroalkyl ethylene oxide adduct having a perfluoroalkyl group with six or less carbon atoms as the fluorinated surfactant. A perfluoroalkyl group with more than six carbon atoms has strong hydrophobicity, thus is likely to be adsorbed onto the particle surface of a pigment due to the hydrophobic interaction, and cannot suppress the gloss unevenness.

The perfluoroalkyl ethylene oxide adduct having a perfluoroalkyl group with six or less carbon atoms has comparatively low hydrophobicity. If having low hydrophobicity, the surfactant has a lower orientation speed toward an interface, and the ink has a higher dynamic surface tension. In other words, it is supposed that by adding a perfluoroalkyl ethylene oxide adduct having a perfluoroalkyl group with six or less carbon atoms to an ink, the gloss unevenness can be effectively suppressed, but it is difficult to make an ink have a dynamic surface tension $\gamma_{10}$ of 40 mN/m or less. Hence, the inventors of the present invention have studied a combination use of the above-mentioned fluorinated surfactant with an additional surfactant in order to make an ink have a dynamic surface tension $\gamma_{10}$ of 40 mN/m or less and a static surface tension of 25 mN/m or more. As a result, it has been found that an acetyleneglycol type surfactant having an HLB value determined by Griffin's method of 10 or more is preferred as the additional surfactant. It has also been found that when the acetyleneglycol type surfactant is an acetyleneglycol ethylene oxide adduct, the effect of suppressing gloss unevenness can be achieved.

First, the reason why the acetyleneglycol type surfactant having an HLB value of 10 or more is preferred as the additional surfactant that makes an ink have a dynamic surface tension $\gamma_{10}$ of 40 mN/m or less and a static surface tension of 25 mN/m or more will be described below. To reduce the dynamic surface tension $\gamma_{10}$ of an ink, it is effective to use a highly hydrophobic surfactant. However, the highly hydrophobic surfactant is likely to cause the adsorption exchange for a resin dispersant on the particle surface of a pigment. On this account, from the viewpoint of suppressing gloss unevenness, it is not preferred to use the highly hydrophobic surfactant. In other words, the inventors of the present invention have found that a surfactant having low hydrophobicity but capable of reducing the dynamic surface tension of an ink is useful and an acetyleneglycol type surfactant having an HLB value of 10 or more is preferred as such a surfactant.

The acetyleneglycol type surfactant has a comparatively small molecular weight among the surfactants but has a three-dimensional structure and thus is difficult to form micelles. On this account, the surfactant has low hydrophobicity but is rapidly oriented toward an interface and has high performance of reducing dynamic surface tension even in a short lifetime region of about 10 milliseconds. As described later, in order to suppress gloss unevenness, the acetyleneglycol type surfactant is required to have an HLB value determined by Griffin's method of 10 or more. In addition, the acetyleneglycol type surfactant has lower surface activating ability than that of the fluorinated surfactant, and the static surface tension of an ink is dominated by the surface activating ability of the fluorinated surfactant. On this account, even when these two surfactants are used in combination, the ink can have a static surface tension of 25 mN/m or more.

Next, the reason why the effect of suppressing gloss unevenness is achieved by using the acetyleneglycol ethylene oxide adduct having an HLB value of 10 or more as the acetyleneglycol type surfactant will be described below. The inventors of the present invention suppose that the effect of suppressing gloss unevenness is achieved due to characteristics of the perfluoroalkyl ethylene oxide adduct having a perfluoroalkyl group with six or less carbon atoms and the interaction of these two surfactants. Each of these two surfactants has an ethylene oxide group as the hydrophilic group, and thus the surfactants attract each other through water molecules. The acetyleneglycol type surfactant is rapidly oriented toward an interface. Hence, in the process in which an ink is ejected from a recording head, then adheres to a recording medium, and permeates the recording medium, the acetyleneglycol type surfactant and the fluorinated surfactant rapidly move to an interface while attracting each other. On this account, these two surfactants are present in close vicinity to a pigment in a shorter period of time, and the adsorption exchange between the surfactant and a resin dispersant is unlikely to be caused as compared with when the fluorinated surfactant is present alone. However, if the acetyleneglycol type surfactant has high hydrophobicity (a HLB value of less than 10), the adsorption exchange between the acetyleneglycol type surfactant and a resin dispersant is caused. In other words, the fluorinated surfactant having a weak intermolecular force has such characteristics as to be comparatively unlikely to cause the adsorption exchange for a resin dispersant among the surfactants having high surface activating ability. In addition, due to the interaction between the fluorinated surfactant and the acetyleneglycol type surfactant, the adsorption exchange for a resin dispersant is further unlikely to be caused. In association with this effect of suppressing the adsorption exchange, the gloss unevenness is suppressed to some extent.

Next, the inventors of the present invention have studied an ink containing the above-mentioned fluorinated surfactant and the acetyleneglycol type surfactant. The result has revealed that the effect of suppressing gloss unevenness is achieved but images having highly improved gloss unevenness cannot be recorded. As a result of a further study, it has been found that the gloss unevenness is improved at a higher level by satisfying the following requirements (i) and (ii). The inventors suppose that such an improvement of the gloss unevenness is achieved by the following mechanism.

(i) A water-soluble organic solvent having a dielectric constant at 25° C. of 20.0 or more to 30.0 or less is contained.
(ii) The content (% by mass) of the water-soluble organic solvent relative to the content (% by mass) of the fluorinated surfactant is 100 times or more to 200 times or less in terms of mass ratio.

The water-soluble organic solvent having a dielectric constant of 20.0 or more to 30.0 or less has such characteristics as to exhibit a high affinity with a hydrophobic group containing a fluorine atom but to exhibit a low affinity with the particle surface of a pigment. It is supposed that the above-mentioned water-soluble organic solvent added to an ink has a high affinity with a fluorinated surfactant, thus interferes with the hydrophobic interaction between the surfactant and the particle surface of a pigment, and suppresses the adsorption exchange between the surfactant and a resin dispersant.

If having a dielectric constant of less than 20.0, the water-soluble organic solvent has a high affinity with both the perfluoroalkyl group of a fluorinated surfactant and the particle surface of a pigment, and thus the gloss unevenness cannot be improved. If having a dielectric constant of more than 30.0, the water-soluble organic solvent has a low affinity with the perfluoroalkyl group, and the gloss unevenness cannot be improved. If the content (% by mass) of the water-soluble organic solvent having a dielectric constant of 20.0 or more to 30.0 or less relative to the content (% by mass) of the fluorinated surfactant is less than 100 times in terms of mass ratio, the adsorption exchange between the surfactant and a resin dispersant cannot be suppressed due to the small amount of the water-soluble organic solvent. Accordingly, the gloss unevenness cannot be suppressed. If the mass ratio of the content (% by mass) of the water-soluble organic solvent having a dielectric constant of 20.0 or more to 30.0 or less relative to the content (% by mass) of the fluorinated surfactant is more than 200, an excess amount of the water-soluble organic solvent is present. Accordingly, when such an ink is applied to a recording medium and water evaporates, the excess water-soluble organic solvent rapidly destabilizes the pigment dispersibility, and the gloss clarity deteriorates in some cases.

Ink

The ink of the present invention is an aqueous ink for ink jet containing a pigment, a water-soluble resin for dispersing the pigment, a water-soluble organic solvent, an acetyleneglycol type surfactant, and a fluorinated surfactant. The ink of the present invention is not required to be used in combination with a liquid that undergoes a reaction and increases the viscosity when the liquid comes in contact with the ink. Components constituting the ink of the present invention, physical properties of the ink, and the like will next be described in detail.

Pigment

The ink of the present invention contains a pigment as a coloring material. The pigment is exemplified by inorganic pigments such as carbon black and organic pigments, which are well-known in the art. Specifically, carbon black and the organic pigments are preferably used. The content (% by mass) of the pigment in the ink is preferably 0.05% by mass or more to 15.00% by mass or less and more preferably 0.10% by mass or more to 10.00% by mass or less based on the total mass of the ink.

The pigment preferably has an average primary particle size of 10 nm or more to 300 nm or less. If the pigment has an average primary particle size of less than 10 nm, the interaction between primary particles becomes high, and thus the storage stability of the ink is slightly deteriorated in some cases. If the pigment has an average primary particle size of more than 300 nm, the chromaticness or the glossiness of an image is slightly deteriorated in some cases.

The pigment is dispersed in the ink by a water-soluble resin. When such a pigment (resin-dispersed pigment) dispersed by a water-soluble resin is used as the coloring material, the glossiness of images can be improved. In the present invention, the "pigment (resin-dispersed pigment) dispersed by a water-soluble resin" is exemplified by the pigments described below. Specifically, the pigments in the form (1) or (2) are preferred, and the pigments in the form (1) are more preferred.

(1) Pigments in which a water-soluble resin is physically adsorbed onto the particle surface of the pigment
(2) Resin-bonded self-dispersible pigments in which an organic group in a water-soluble resin is chemically bonded to the particle surface of the pigments to modify the pigments
(3) Microcapsule pigments coated with a water-soluble resin Water-Soluble Resin (Resin Dispersant)

The ink of the present invention contains a water-soluble resin (hereinafter also called "resin dispersant") for dispersing the pigment in the ink. The water-soluble resin is a copolymer having two or more units derived from two or more kinds of monomers. If the resin dispersant is water-insoluble, the viscosity is likely to increase rapidly when the ink is applied to a recording medium and the water evaporates, and thus the gloss clarity of images deteriorate. The water-soluble resin is preferably a resin having a hydrophilic unit and a hydrophobic unit as constituent units. The water-soluble resin is preferably a water-soluble acrylic resin at least having a unit that has a (meth)acrylic structure derived from (meth)acrylic acid or a (meth)acrylate ester. In the below description, "(meth)acrylic" means "acrylic" and "methacrylic", and "(meth)acrylate" means "acrylate" and "methacrylate".

The hydrophilic unit (a unit having a hydrophilic group such as an acidic group or a hydroxy group) can be formed by polymerizing a monomer having a hydrophilic group, for example. Specific examples of the monomer having a hydrophilic group include anionic monomers including acidic monomers having a carboxy group, such as (meth)acrylic acid, itaconic acid, maleic acid, and fumaric acid and anhydrides and salts of these acidic monomers; monomers having a hydroxy group, such as 2-hydroxyethyl (meth)acrylate and 3-hydroxypropyl (meth)acrylate; and monomers having an ethylene oxide group, such as methoxy (mono, di, tri, and poly)ethylene glycol (meth) acrylates.

Examples of the cation constituting the salt of an acidic monomer include a lithium ion, a sodium ion, a potassium ion, an ammonium ion, and organic ammonium ions. The water-soluble resin used in the ink of the present invention has an acid value and thus the hydrophilic unit contains a unit derived from the above-mentioned anionic monomer. The water-soluble resin typically exhibits water-solubility when being neutralized with a neutralizer such as hydroxides of alkali metals (for example, lithium, sodium, and potassium) and aqueous ammonia.

The hydrophobic unit (a unit not having a hydrophilic group such as an acidic group or a hydroxy group) can be formed by polymerizing a monomer having a hydrophobic group, for example. Specific examples of the monomer having a hydrophobic group include monomers having an aromatic ring, such as styrene, α-methylstyrene, and benzyl (meth)acrylate; and monomers having an aliphatic group, such as ethyl (meth)acrylate, methyl (meth)acrylate, (iso)

propyl (meth)acrylate, (n-, iso-, t-)butyl (meth)acrylates, and 2-ethylhexyl (meth)acrylate (i.e., (meth)acrylate monomers).

The water-soluble resin preferably has a unit derived from (meth)acrylic acid as the hydrophilic unit and also preferably has a unit derived from a monomer having an aliphatic group or an aromatic ring as the hydrophobic unit. The water-soluble resin more preferably has a unit derived from methacrylic acid as the hydrophilic unit and also more preferably has a unit derived from at least one monomer of styrene and α-methylstyrene as the hydrophobic unit. Such a water-soluble resin is likely to interact particularly with the pigment and thus is preferred.

The water-soluble resin (resin dispersant) may have any molecular structure and have any one of a linear structure, a branched structure, a random copolymer structure, and a block copolymer structure.

Whether the pigment is dispersed by a resin and the type of the resin dispersing a pigment in an ink that contains a plurality kinds of resins can be determined by the following procedure. An ink is concentrated or diluted to prepare a liquid having a total solid content of about 10% by mass. The prepared liquid is centrifuged at 12,000 rpm for 1 hour. By the centrifugation, a liquid layer containing a water-soluble organic solvent, resins not contributing the dispersion, and the like is separated from a precipitate including the pigment, and the precipitate is taken out. The resin contained in the precipitate taken out in this manner is recognized as the resin dispersing the pigment. In other words, the resin contained as the main component in the precipitate is the resin contributing the dispersion of the pigment (resin dispersant). Meanwhile, the resin contained as the main component in the liquid layer is a resin not contributing the dispersion of the pigment. In the ink of the present invention, the resin contained as the main component in the precipitate containing the pigment is required to be a water-soluble resin.

Whether the resin is water-soluble is determined by the following procedure. First, by neutralization with an alkali (such as sodium hydroxide and potassium hydroxide) in an amount corresponding to the acid value, a liquid containing a resin (resin solid content: 10% by mass) is prepared. Next, the prepared liquid is diluted 10-fold (in terms of volume) with pure water to prepare a sample solution. The particle size of the resin in the sample solution is then determined by dynamic light scattering. When the particles having particle sizes are not observed, such a resin can be recognized to be water-soluble. The conditions for the measurement are as follows:

Measurement Conditions
 Set-Zero: 30 seconds
 Number of measurements: three times
 Measurement time: 180 seconds As the particle size distribution analyzer, a particle size analyzer (for example, trade name "UPA-EX150", manufactured by NIKKISO CO., LTD.) by dynamic light scattering can be used, for example. Needless to say, the particle size distribution analyzer, the measurement conditions, and the like are not limited to the above.

The water-soluble resin preferably has an acid value of 50 mg KOH/g or more to 350 mg KOH/g or less and more preferably 80 mg KOH/g or more to 250 mg KOH/g or less. If the water-soluble resin has an acid value of less than 50 mg KOH/g, the ejecting performance of the ink slightly deteriorates in some cases. If the water-soluble resin has an acid value of more than 350 mg KOH/g, the storage stability of the ink slightly deteriorates in some cases. The acid value of the water-soluble resin can be determined by potentiometric titration.

The water-soluble resin preferably has a weight-average molecular weight Mw of 1,000 or more to 30,000 or less and more preferably 3,000 or more to 15,000 or less. The water-soluble resin preferably has a polydispersity (ratio Mw/Mn between weight-average molecular weight Mw and number-average molecular weight Mn) of 1.0 or more to 3.0 or less. The weight-average molecular weight Mw, the number-average molecular weight Mn, and the polydispersity Mw/Mn of the water-soluble resin can be determined by size exclusion chromatography (GPC method) in accordance with JIS Handbook, Chemical analysis K0124.

In the ink, the content (% by mass) of the water-soluble resin is preferably 0.01% by mass or more to 5.00% by mass or less and more preferably 0.02% by mass or more to 3.00% by mass or less based on the total mass of the ink. When the amount of the water-soluble resin adsorbed to the pigment is comparatively small, the water-soluble resin is unlikely to be released from the pigment, and thus the gloss unevenness is unlikely to be caused. To achieve such conditions, the content (% by mass) of the pigment relative to the content (% by mass) of the water-soluble resin in the ink is preferably 1.0 times or more to 10.0 times or less and more preferably 2.0 times or more to 7.0 times or less in terms of mass ratio. If the mass ratio is more than 10.0 times, the release of a resin dispersant affects the glossiness, and thus the effect of suppressing gloss unevenness is reduced in some cases. If the mass ratio is less than 1.0 times, the solid content of the ink increases, and thus the gloss clarity of images deteriorate in some cases.

Fluorinated Surfactant

The ink of the present invention contains a fluorinated surfactant. The fluorinated surfactant is a perfluoroalkyl ethylene oxide adduct having a perfluoroalkyl group with six or less carbon atoms. The number of carbon atoms of the perfluoroalkyl group is preferably 2 or more and more preferably 4 or more. As such a fluorinated surfactant, a commercial product can be used. Specific examples of the nonionic fluorinated surfactant include commercial products available under the trade names, MEGAFACE F-470 and F-444 (manufactured by DIC Co.); Surflon S-141 and S-145 (manufactured by Asahi Glass Co.): and Zonyl FS-3100 (manufactured by Du Pont Co.). If the perfluoroalkyl ethylene oxide adduct has a branched molecular structure, the difference in polarity between the perfluoroalkyl group as the hydrophobic group and the ethylene oxide group as the hydrophilic group becomes large. Such a perfluoroalkyl ethylene oxide adduct has a larger intermolecular force and is likely to be adsorbed onto the particle surface of a pigment. On this account, the effect of suppressing gloss unevenness is reduced in some cases. Hence, a linear perfluoroalkyl ethylene oxide adduct is more preferably used.

The content of the fluorinated surfactant in the ink, is preferably set in such a range that the ink has a dynamic surface tension $\gamma_{10}$ of 40 mN/m or less and a static surface tension γ of 25 mN/m or more. Specifically, the content (% by mass) of the fluorinated surfactant in the ink is preferably 0.01% by mass or more to 0.20% by mass or less based on the total mass of the ink.

Acetyleneglycol Type Surfactant

The ink of the present invention contains an acetyleneglycol ethylene oxide adduct as an acetyleneglycol type surfactant. As the acetyleneglycol ethylene oxide adduct, the compound represented by General Formula (I) is preferably used. The sum x+y represents the addition number of ethylene oxide groups as a hydrophilic group and is a natural number. The sum x+y is preferably 5 or more and more preferably 6 or more. The sum x+y is preferably 50 or less and more preferably 30 or less.

Formula

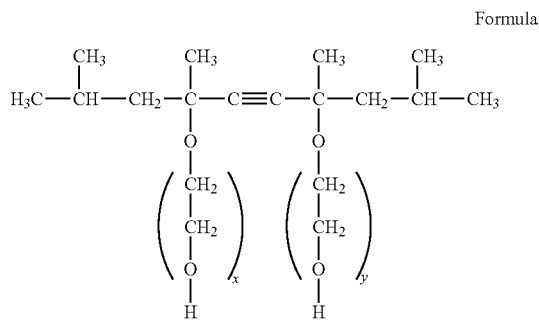

(In General Formula (I), x+y represents a natural number)

The acetyleneglycol type surfactant has an HLB value determined by Griffin's method of 10 or more. If having an HLB value of less than 10, the acetyleneglycol type surfactant has high hydrophobicity and causes the adsorption exchange for a resin dispersant on the particle surface of the pigment, and the gloss unevenness is likely to be caused on images. As described later, the HLB value is 20 or less. In the case of the compound represented by General Formula (I), x+y is required to be 5 or more in order to satisfy an HLB value of 10 or more.

The HLB value by Griffin's method can be calculated in accordance with Expression (1). The HLB value determined by Griffin's method is a physical property value indicating the degree of hydrophilicity or lipophilicity of a surfactant and is a value ranging from 0 to 20. A smaller HLB value indicates higher lipophilicity, and a larger HLB value indicates higher hydrophilicity.

HLB value=20×formula weight of hydrophilic group of surfactant/molecular weight of surfactant  (1)

As the acetyleneglycol type surfactant such as the compound represented by General Formula (I), a commercial product can be used. Specific examples of the acetyleneglycol type surfactant include commercial products available under the trade names, Acetylenol E 60 and Acetylenol E 100 (manufactured by Kawaken Fine Chemicals Co.); and Surfynol 465 and Surfynol 485 (manufactured by Nissin Chemical Industry Co.). The content of the acetyleneglycol type surfactant in the ink is preferably set in such a range that the ink has a dynamic surface tension $\gamma_{10}$ of 40 mN/m or less and a static surface tension $\gamma$ of 25 mN/m or more. Specifically, the content (% by mass) of the acetyleneglycol type surfactant in the ink is preferably 0.10% by mass or more to 1.00% by mass or less based on the total mass of the ink.

Water-Soluble Organic Solvent

The ink of the present invention contains a water-soluble organic solvent (hereinafter also called "particular water-soluble organic solvent") having a dielectric constant at 25° C. of 20.0 or more to 30.0 or less. The content (% by mass) of the particular water-soluble organic solvent relative to the content (% by mass) of the fluorinated surfactant based on the total mass of the ink is 100 times or more to 200 times or less in terms of mass ratio. The content (% by mass) of the particular water-soluble organic solvent in the ink is preferably 3.00% by mass or more to 20.00% by mass or less and more preferably 5.00% by mass or more to 15.00% by mass or less based on the total mass of the ink. Specific examples of the water-soluble organic solvent having a dielectric constant of 20.0 or more to 30.0 or less include 1,3-butanediol (30.0), 1,2-propanediol (28.8), 1,2,6-hexanetriol (28.5), 2-methyl-1,3-propanediol (28.3), 2-pyrrolidone (28.0), 1,5-pentanediol (27.0), 3-methyl-1,5-pentanediol (23.9), ethyl alcohol (23.8), and triethylene glycol (22.7) (values in the parentheses represent dielectric constants at 25° C.)

The dielectric constants of water and water-soluble organic solvents can be determined by using a dielectric constant meter (for example, trade name "BI-870", manufactured by BROOKHAVEN INSTRUMENTS CORPORATION). The dielectric constant of a water-soluble organic solvent that is solid at 25° C. can be determined by measuring the dielectric constant of 50% by mass aqueous solution and calculating the objective dielectric constant in accordance with Formula (2).

$$\epsilon_{sol}=2\epsilon_{50\%}-\epsilon_{water} \quad (2)$$

$\epsilon_{sol}$: dielectric constant of a water-soluble organic solvent being solid at 25° C.
$\epsilon_{50\%}$: dielectric constant of 50% by mass aqueous solution of the water-soluble organic solvent being solid at 25° C.
$\epsilon_{water}$: dielectric constant of water The reason why the dielectric constant of a water-soluble organic solvent being solid at 25° C. is calculated from the dielectric constant of 50% by mass aqueous solution is as follows: Some of the water-soluble organic solvents that are solid at 25° C. and usable as a component of an aqueous ink are difficult to give an aqueous solution having a high concentration of more than 50% by mass. Meanwhile, the dielectric constant of an aqueous solution having a low concentration of 10% by mass or less is dominated by the dielectric constant of water. It is thus difficult to determine the probable (practical) dielectric constant value of such a water-soluble organic solvent. Hence, the inventors of the present invention have studied and found that most of the water-soluble organic solvents that are solid at 25° C. and usable in inks can give a measurable aqueous solution and the calculated dielectric constants match with the advantageous effects of the invention. For the above reason, the dielectric constant of a water-soluble organic solvent being solid at 25° C. is intended to be calculated from the dielectric constant of 50% by mass aqueous solution in the present invention. For a water-soluble organic solvent that is solid at 25° C. but has a low solubility in water and cannot give 50% by mass aqueous solution, an aqueous solution at saturated concentration is used, and the dielectric constant is calculated in accordance with the above calculation of $\epsilon_{sol}$ and is used expediently.

Aqueous Medium

The ink of the present invention is an aqueous ink containing an aqueous medium that is a mixed solvent of water and a water-soluble organic solvent. As the water, deionized water (ion-exchanged water) is preferably used. The content (% by mass) of the water in the ink is preferably 10.00% by mass or more to 90.00% by mass or less based on the total mass of the ink.

As the water-soluble organic solvent, a water-soluble organic solvent (additional water-soluble organic solvent) other than the above water-soluble organic solvent having a dielectric constant at 25° C. of 20.0 or more to 30.0 or less (particular water-soluble organic solvent) can be used in combination. The additional water-soluble organic solvent may be any water-soluble organic solvent, and can be an alcohol, a polyhydric alcohol, a polyglycol, a glycol ether, a nitrogen-containing polar solvent, or a sulfur-containing polar solvent, for example. In the ink, the content (% by mass) of the water-soluble organic solvent is preferably 3.00% by mass or more to 50.00% by mass or less and more preferably 15.00% by mass or more to 40.00% by mass or less based on the total mass of the ink. If the content of the water-soluble organic solvent is out of this range, a high level of ink ejecting stability cannot be sufficiently achieved in some cases.

The water-soluble organic solvent can be specifically exemplified by the following solvents including the above-exemplified particular water-soluble organic solvents (values in the parentheses represent dielectric constants at 25° C.). Monohydric alcohols having 1 to 4 carbon atoms, such as methyl alcohol (33.1), ethyl alcohol (23.8), n-propyl alcohol (12.0), isopropyl alcohol (18.3), n-butyl alcohol, sec-butyl alcohol, and tert-butyl alcohol. Dihydric alcohols such as 1,2-propanediol (28.8), 1,3-butanediol (30.0), 1,4-butanediol (31.1), 1,5-pentanediol (27.0), 1,2-hexanediol (14.8), 1,6-hexanediol (7.1), 2-methyl-1,3-propanediol (28.3), and 3-methyl-1,5-pentanediol (23.9). Polyhydric alcohols such as 1,2,6-hexanetriol (28.5), glycerol (42.3), trimethylolpropane (33.7), and trimethylolethane. Alkylene glycols such as ethylene glycol (40.4), diethylene glycol (31.7), triethylene glycol (22.7), tetraethylene glycol (20.8), butylene glycol, hexylene glycol, and thiodiglycol. Glycol ethers such as diethylene glycol monomethyl ether, diethylene glycol monoethyl ether, triethylene glycol monoethyl ether, triethylene glycol monobutyl ether (9.8), and tetraethylene glycol monobutyl ether (9.4). Polyalkylene glycols having a number-average molecular weight of 200 to 1,000, such as polyethylene glycol having a number-average molecular weight of 600 (11.5), polyethylene glycol having a number-average molecular weight of 1,000 (4.6), and polypropylene glycol. Nitrogen-containing compounds such as 2-pyrrolidone (28.0), N-methyl-2-pyrrolidone (32.0), 1,3-dimethyl-2-imidazolidinone, N-methylmorpholine, urea (110.3), ethylene urea (49.7), and triethanolamine (31.9). Sulfur-containing compounds such as dimethyl sulfoxide (48.9) and bis(2-hydroxyethyl sulfone). As the water-soluble organic solvent contained in the ink, a water-soluble organic solvent having a dielectric constant of 3.0 or more but 120.0 or less and having a lower vapor pressure at 25° C. than that of water is preferably used.

Polyoxyethylene Alkyl Ether

The ink of the present invention preferably further contains a polyoxyethylene alkyl ether having an HLB value determined by Griffin's method of 15 or more. As described above, the HLB value is 20 or less. The ink of the present invention preferably contains the polyoxyethylene alkyl ether in an amount of 0.10% by mass or more to 1.00% by mass or less based on the total mass of the ink. By adding the polyoxyethylene alkyl ether in a predetermined amount, a further excellent effect of suppressing gloss unevenness can be achieved.

The polyoxyethylene alkyl ether is a surfactant commonly used as a dispersant for pigments, thus has properties similar to those of resin dispersants to some extent, and is supposed to have a high affinity with resin dispersants. Hence, the polyoxyethylene alkyl ether has a high affinity with a resin dispersant released from the particle surface of a pigment and increases the viscosity of the resin dispersant released in the process in which an ink permeates a recording medium. Accordingly, it is supposed that a larger amount of the water-soluble resin is left in a pigment layer formed and a further excellent effect of suppressing gloss unevenness can be achieved.

If having a HLB value of less than 15, the polyoxyethylene alkyl ether has high hydrophobicity, thus the adsorption exchange for a resin dispersant (i.e. release of a resin dispersant) is accelerated, and the effect of suppressing gloss unevenness is reduced in some cases. If the content of the polyoxyethylene alkyl ether is less than 0.10% by mass, the polyoxyethylene alkyl ether is contained in an excessively small amount, and thus the effect of suppressing gloss unevenness is reduced in some cases. If the content of the polyoxyethylene alkyl ether is more than 1.00% by mass, the gloss clarity deteriorates in some cases. This is because the polyoxyethylene alkyl ether has an effect of reducing the permeation rate of an ink into a recording medium and the improvement of the permeation rate by reducing the surface tension of an ink is suppressed.

The polyoxyethylene alkyl ether has the structure represented by the following formula.

$$R-O-(CH_2CH_2O)_n-H$$

(In the formula, R represents an hydrocarbon group; and n represents a natural number)

In the polyoxyethylene alkyl ether, the number of carbon atoms of R (hydrocarbon group), which is a hydrophobic group, in the formula is preferably in such a range as to provide a surface activating ability. Specifically, the number of carbon atoms of R (hydrocarbon group) in the formula is preferably 12 to 22. Specific examples of R (hydrocarbon group) include a lauryl group (12), a cetyl group (16), a stearyl group (18), an oleyl group (18), and a behenyl group (22) (values in the parentheses represent the number of carbon atoms of an hydrocarbon group). In the formula, n represents the addition number of ethylene oxide groups as the hydrophilic group and is a natural number. n is preferably 10 to 50.

Other Additives

The ink of the present invention can contain various additives such as pH adjusters, anticorrosives, antiseptic agents, antifungal agents, antioxidants, reduction inhibitors, evaporation accelerators, chelating agents, and additional resins, as necessary, in addition to the above-mentioned components. However, if a solid component such as wax particles (e.g. polyolefin particles) is contained, the gloss clarity of images slightly deteriorates in some cases, and thus the ink preferably does not contain such a solid component. The ink of the present invention can also contain common surfactants other than the above-mentioned fluorinated surfactant and the acetyleneglycol type surfactant as long as a predetermined dynamic surface tension and static surface tension are satisfied. Such an additive is typically contained at a considerably small content in the ink and thus has a small influence on the advantageous effect of the invention. On this account, such an additive is not included in the "water-soluble organic solvent" in the present invention and is eliminated from the calculation of the dielectric constant.

Dynamic Surface Tension of Ink

The ink of the present invention has a dynamic surface tension $\gamma_{10}$ at a lifetime of 10 ms of 40 mN/m or less. If having a dynamic surface tension $\gamma_{10}$ of more than 40 mN/m, the ink has insufficient wettability immediately after adhesion to a recording medium, and the gloss clarity of images is not improved. The ink preferably has a dynamic surface tension $\gamma_{10}$ of 30 mN/m or more.

The dynamic surface tension used for specifying the characteristics of the ink in the present invention is determined by a maximum bubble pressure method. The maximum bubble pressure method is a method in which a maximum pressure required for discharging a bubble formed at a tip of a probe (thin tube) immersed in a liquid to be measured and a surface tension of the liquid is determined from the maximum pressure. The maximum pressure is measured while bubbles are continuously formed at the tip of the probe. For the measurement, the time from a time point at which a fresh bubble surface is formed at the tip of a probe to a time point at which a maximum bubble pressure is obtained (a time point at which the curvature radius of a bubble becomes the same as the radius of the tip of the probe) is called lifetime.

Static Surface Tension of Ink

The ink of the present invention has a static surface tension γ of 25 mN/m or more. If having a static surface tension γ of less than 25 mN/m, the ink has a lower permeation rate, and the gloss clarity of images deteriorate. The ink preferably has a static surface tension γ of 30 mN/m or less. If having a static surface tension γ of more than 30 mN/m, the ink has lower permeability, and the gloss clarity of images is unlikely to be improved in some cases. The static surface tension used for specifying the characteristics of the ink in the present invention is determined by a plate method.

Ink Cartridge

The ink cartridge according to the present invention is provided with an ink and an ink storage portion storing this ink. The ink stored in the ink storage portion is the above-described ink according to the present invention. FIG. 1 is a sectional view schematically illustrating an ink cartridge according to an embodiment of the present invention. As illustrated in FIG. 1, an ink supply port 12 for supplying an ink to a recording head is provided in a bottom of the ink cartridge. The interior of the ink cartridge is the ink storage portion storing the ink. The ink storage portion is made up by an ink storage chamber 14 and an absorber storage chamber 16, and these chambers are communicated with each other through a communication port 18. The absorber storage chamber 16 is communicated with the ink supply port 12. A liquid ink 20 is stored in the ink storage chamber 14, and absorbers 22 and 24 holding the ink in an impregnated state are stored in the absorber storage chamber 16. The ink storage portion may also be so constructed that the whole amount of the ink stored is held by the absorber without providing the ink storage chamber. In addition, the ink storage portion may also be so constructed that the whole amount of the ink is stored in a liquid state without having the absorber. Further, the ink cartridge may also be constructed so as to have an ink storage portion and a recording head.

Ink Jet Recording Method

The ink jet recording method according to the present invention is a method of ejecting the above-described ink according to the present invention by a recording head of an ink jet system to record an image on a recording medium. Systems for ejecting the ink include a system in which mechanical energy is applied to the ink and a system in which thermal energy is applied to the ink. In the present invention, the system in which the thermal energy is applied to the ink to eject the ink is particularly favorably adopted. Steps of the ink jet recording method may be those publicly known except that the ink according to the present invention is used.

Figure 2A:
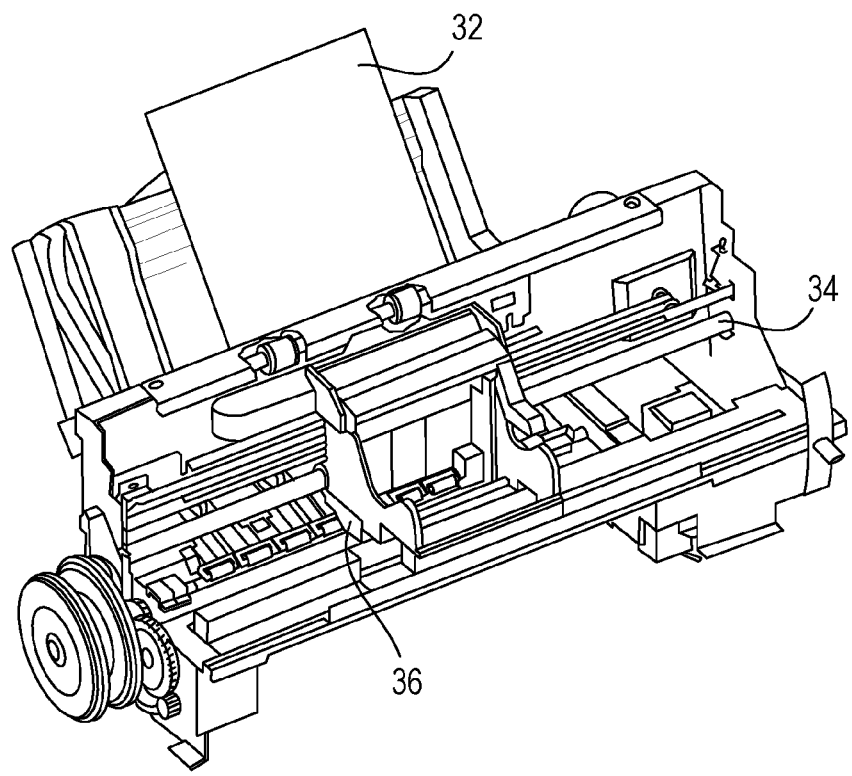
FIGS. 2A and 2B are schematic views illustrating an exemplary ink jet recording apparatus used for an ink jet recording method of the present invention.
Figure 2B:
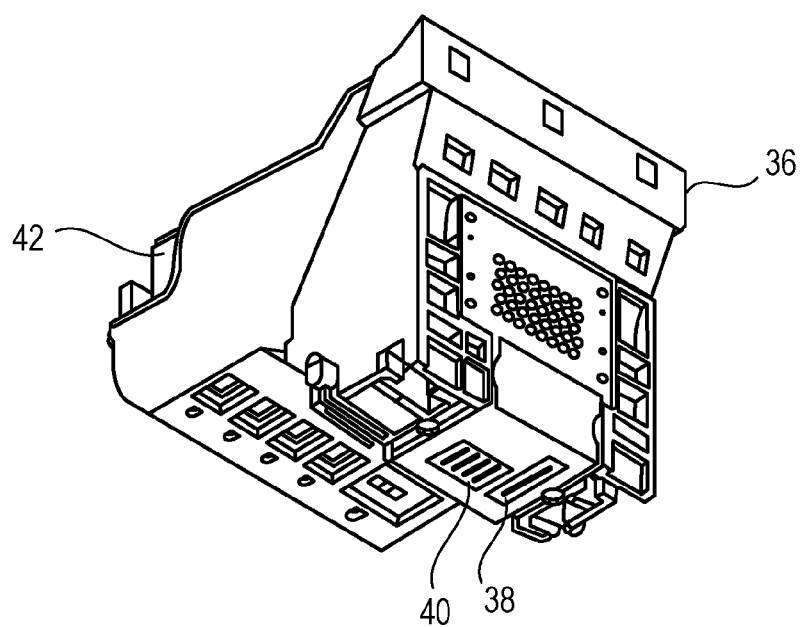

FIGS. 2A and 2B schematically illustrate an exemplary ink jet recording apparatus used in the ink jet recording method according to the present invention, in which FIG. 2A is a perspective view illustrating a principal part of the ink jet recording apparatus, and FIG. 2B is a perspective view illustrating a head cartridge. In the ink jet recording apparatus, a conveyance unit (not illustrated) for conveying a recording medium 32 and a carriage shaft 34 are provided. A head cartridge 36 can be installed on the carriage shaft 34. The head cartridge 36 is provided with recording heads 38 and 40 and is so constructed that an ink cartridge 42 is set. Inks (not illustrated) are ejected toward the recording medium 32 from the recording heads 38 and 40 while the head cartridge 36 is being carried in a main scanning direction along the carriage shaft 34. The recording medium 32 is then conveyed in a sub scanning direction by the conveyance unit (not illustrated), whereby an image is recorded on the recording medium 32.

The recording medium to be recorded by using the ink of the present invention may be any recording medium but is preferably a paper having permeability, such as plain paper and recording media having a coating layer (glossy paper and art paper, for example). It is particularly preferred to use the recording medium having a coating layer that allows at least some of pigment particles in the ink to be present on the surface of the recording medium or on the vicinity thereof. Such a recording medium can be selected depending on an intended use purpose of a recorded article on which an image is recorded. Example of the recording medium include glossy papers that are suitable for giving images having glossiness of photographic image quality and art papers that take advantage of substrate textures (for example, drawing paper-like texture, canvas-like texture, and Japanese paper-like texture) in order to express preferred images such as pictures, photographs, and graphic images. Specifically, what is called a glossy paper having a glossy surface of a coating layer is particularly preferably used.

EXAMPLES

The present invention will next be described in further detail with reference to examples and comparative examples, but the invention is not intended to be limited to the following examples without departing from the scope of the invention. The amounts of components expressed with "part" or "%" are based on mass unless otherwise noted.

Preparation of Resin Dispersant

The following resin dispersants were prepared from commercially available resins or by synthesis in a usual manner.

Resin Dispersant 1

A commercially available styrene-acrylic acid copolymer (trade name "Joncryl 680", manufactured by BASF) was prepared as resin dispersant 1. To the resin dispersant 1, potassium hydroxide in such an amount as to be 0.85 equivalent of the acid value and an appropriate amount of ion-exchanged water were added, giving an aqueous solution in which the content (solid content) of resin dispersant 1 was 20.0%.

Resin Dispersants 2 and 3

In a usual manner, a benzyl methacrylate-methacrylic acid copolymer (resin dispersant 2) having an acid value of 165 mg KOH/g and a styrene-butyl acrylate-acrylic acid copolymer (resin dispersant 3) having an acid value of 165 mg KOH/g were synthesized. To each of the obtained resin dispersants 2 and 3, potassium hydroxide in such an amount as to be 0.85 equivalent of the acid value and an appropriate amount of ion-exchanged water were added, giving an aqueous solution in which the content (solid content) of the resin dispersant was 20.0%.

Resin Dispersant 4

By referring to the description of Production Example 1 in Japanese Patent Application Laid-Open No. 2008-266363, a water-insoluble polymer having an acid value of 78 mg KOH/g and a weight-average molecular weight of 74,000 was synthesized. To the obtained water-insoluble polymer, an aqueous potassium hydroxide solution in such an amount as to be 0.85 equivalent of the acid value and an appropriate amount of ion-exchanged water were added, giving an aqueous dispersion of resin dispersant 4 having a resin content (solid content) of 20.0%.

Determination Whether a Resin is Water-Soluble

The aqueous solutions of the resins 1 to 3 were diluted 20-fold (in terms of volume) with pure water to prepare samples. The particle size of each sample was determined by dynamic light scattering with a particle size analyzer (trade name "UPA-EX150", manufactured by NIKKISO CO., LTD.) under conditions of a Set-Zero of 30 seconds, a number of measurements of three times, and a measurement time of 180 seconds. As a result, no particle size was recognized in each resin sample, and this revealed that each resin was water-soluble. Separately, to the aqueous dispersion of the resin 4, potassium hydroxide in an amount equivalent to the acid value of the resin was further added, and the resulting aqueous dispersion was diluted 20-fold (in terms of volume) with pure water to prepare a sample. The sample was subjected to measurement by dynamic light scattering in the same manner as in the case of the aqueous solutions of the resins 1 to 3, and the particle size was determined. The result revealed that the resin 4 was water-insoluble.

Preparation of Pigment Dispersion Liquid

The components (unit: part) shown in the upper part in Table 1 and 85 parts of 0.3-mm zirconia beads were placed in a batch type vertical sand mill (manufactured by Aimex Co.) and subjected to dispersion treatment for 3 hours while being cooled with water. The resulting mixture was then centrifuged to remove non-dispersed components including coarse particles. Next, the mixture was subjected to pressure filtration through a cellulose acetate filter with a pore size of 3.0 μm (manufactured by ADVANTEC Co.), giving pigment dispersion liquids 1 to 12. The lower part in Table 1 shows the content P (%) of each pigment, the content R (%) of each resin, and the P/R value. The details of the materials in Table 1 are shown below.

C.I. Pigment Yellow 74 (trade name "Hansa Yellow 5GXB", manufactured by Clariant Co.)

C.I. Pigment Blue 15:3 (trade name "Hostaperm Blue B2G", manufactured by Clariant Co.)

Solid solution pigment (a solid solution of C.I. Pigment Red 202 and C.I. Pigment Violet 19, trade name "Cromophtal Jet Magenta 2BC", manufactured by Ciba Specialty Chemicals Co.)

C.I. Pigment Red 254 (trade name "Irgaphor Red BT-CF", manufactured by Ciba Specialty Chemicals Co.)

Carbon black (trade name "No. 900", manufactured by Mitsubishi Chemical Corporation Co.)

TABLE 1

Constitution and characteristics of pigment dispersion

| | Pigment dispersion liquid | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| C.I. Pigment Yellow 74 | 12.0 | | | | | 12.0 | 12.0 | 6.0 | 12.0 | 14.0 | 12.0 | 12.0 |
| C.I. Pigment Blue 15:3 | | 12.0 | | | | | | | | | | |
| Solid solution pigment | | | 12.0 | | | | | | | | | |
| C.I. Pigment Red 254 | | | | 12.0 | | | | | | | | |
| Carbon black | | | | | 12.0 | | | | | | | |
| Aqueous solution of resin dispersant 1 | 24.0 | 24.0 | 24.0 | 24.0 | 24.0 | | | 60.0 | 60.0 | 6.0 | 6.0 | |
| Aqueous solution of resin dispersant 2 | | | | | | 24.0 | | | | | | |
| Aqueous solution of resin dispersant 3 | | | | | | | 24.0 | | | | | |
| Aqueous dispersion of resin dispersant 4 | | | | | | | | | | | | 24.0 |
| Ion-exchanged water | 64.0 | 64.0 | 64.0 | 64.0 | 64.0 | 64.0 | 64.0 | 34.0 | 28.0 | 80.0 | 82.0 | 64.0 |
| Content P (%) of pigment | 10.0 | 10.0 | 10.0 | 10.0 | 10.0 | 10.0 | 10.0 | 5.0 | 10.0 | 12.0 | 10.0 | 10.0 |
| Content R (%) of resin | 4.0 | 4.0 | 4.0 | 4.0 | 4.0 | 4.0 | 4.0 | 10.0 | 10.0 | 1.0 | 1.0 | 4.0 |
| P/R value | 2.5 | 2.5 | 2.5 | 2.5 | 2.5 | 2.5 | 2.5 | 0.5 | 1.0 | 12.0 | 10.0 | 2.5 |

Surfactant

Characteristics of the surfactants used for preparing the inks are shown in Table 2. In Table 2, "carbon number" represents the number of carbon atoms of a perfluoroalkyl group.

TABLE 2

Characteristics of surfactant

| Surfactant | Name | HLB value | Carbon number | Trade name etc. |
|---|---|---|---|---|
| 1 | Acetyleneglycol ethylene oxide adduct | 17 | — | Surfynol 485 manufactured by Nissin Chemical Industry |
| 2 | Acetyleneglycol ethylene oxide adduct | 13 | — | Acetylenol E 100 manufactured by Kawaken Fine Chemicals |
| 3 | Acetyleneglycol ethylene oxide adduct | 11 | — | Acetylenol E 60 manufactured by Kawaken Fine Chemicals |
| 4 | Acetyleneglycol ethylene oxide adduct | 9 | — | Acetylenol E 40 manufactured by Kawaken Fine Chemicals |

TABLE 2-continued

Characteristics of surfactant

| Surfactant | Name | HLB value | Carbon number | Trade name etc. |
|---|---|---|---|---|
| 5 | Perfluoroalkyl ethylene oxide adduct | — | 6 | Zonyl FS-3100 manufactured by DuPont |
| 6 | Perfluoroalkyl ethylene oxide adduct | — | 6 | MEGAFACE F-444 manufactured by DIC |
| 7 | Perfluoroalkyl carboxylate | — | — | MEGAFACE F-410 manufactured by DIC |
| 8 | Perfluoroalkyl ethylene oxide adduct | — | 8 | Zonyl FSO-100 manufactured by DuPont |
| 9 | Silicone-containing surfactant | — | — | BYK 348 manufactured by BYK-Chemie |
| 10 | Polyoxyethylene oleyl ether | 18 | — | NIKKOL BO50 manufactured by Nikko Chemicals |
| 11 | Polyoxyethylene cetyl ether | 16 | — | NIKKOL BC20 manufactured by Nikko Chemicals |
| 12 | Polyoxyethylene alkyl (C12-14) ether | 16 | — | SOFTANOL 200 manufactured by Nippon Shokubai |
| 13 | Polyoxyethylene oleyl ether | 12 | — | NIKKOL BO10 manufactured by Nikko Chemicals |

Preparation of Ink

Examples 1 to 31, Comparative Examples 1 to 13

The components (unit: %) shown in the upper part in Table 3 were mixed and thoroughly stirred, and the resulting mixture was subjected to pressure filtration through a cellulose acetate filter with a pore size of 0.8 μm (manufactured by ADVANTEC Co.), giving each ink. The dielectric constants of water-soluble organic solvents shown in the parentheses are values determined by using a dielectric constant meter (trade name "BI-870", manufactured by BROOKHAVEN INSTRUMENTS CORPORATION Co.), and the values of water-soluble organic solvents solid at 25° C. are values calculated in accordance with Expression (2). The lower part in Table 3 shows the content (content F (%)) of the fluorinated nonionic surfactant in each ink, the content (content S (%)) of the water-soluble organic solvent having a dielectric constant of 20.0 or more to 30.0 or less, and the S/F value. The lower part in Table 3 shows the dynamic surface tension ($\gamma_{10}$ (mN/m)) at a lifetime of 10 ms and the static surface tension ($\gamma$ (mN/m)) of each ink. The dynamic surface tension $\gamma_{10}$ was determined at 25° C. with a dynamic surface tensiometer (trade name "BUBBLE PRESSURE TENSIOMETER BP-2", manufactured by KRUSS Co.) by the maximum bubble pressure method. The static surface tension $\gamma$ was determined by using an automatic surface tensiometer (trade name "DY-300", manufactured by Kyowa Interface Science Co., Ltd.). In Table 3, "Proxel GXL" (trade name) is an antiseptic agent manufactured by Arch Chemicals Co.

TABLE 3

Constitution and characteristics of ink

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Pigment dispersion liquid number | 1 | 2 | 3 | 4 | 5 | 6 | 7 | 1 | 1 | 1 | 1 |
| Pigment dispersion liquid | 30.00 | 30.00 | 30.00 | 30.00 | 30.00 | 30.00 | 30.00 | 30.00 | 30.00 | 30.00 | 30.00 |
| Glycerol (42.3) | 5.00 | 5.00 | 5.00 | 5.00 | 5.00 | 5.00 | 5.00 | 5.00 | 5.00 | 5.00 | 5.00 |
| Triethanolamine (31.9) | 0.10 | 0.10 | 0.10 | 0.10 | 0.10 | 0.10 | 0.10 | 0.10 | 0.10 | 0.10 | 0.10 |
| 1,4-Butanediol (31.1) | | | | | | | | | | | |
| 1,3-Butanediol (30.0) | | | | | | | | | | | |
| 2-Pyrrolidone (28.0) | 5.00 | 5.00 | 5.00 | 5.00 | 5.00 | 5.00 | 5.00 | 5.00 | 5.00 | 5.00 | 5.00 |
| Triethylene glycol (22.7) | 5.00 | 5.00 | 5.00 | 5.00 | 5.00 | 5.00 | 5.00 | 5.00 | 5.00 | 5.00 | 3.00 |
| Isopropyl alcohol (18.3) | | | | | | | | | | | |
| 1,2-Hexanediol (14.8) | 5.00 | 5.00 | 5.00 | 5.00 | 5.00 | 5.00 | 5.00 | | | | 5.00 |
| Surfactant 1 | | | | | | | | 0.80 | | 0.80 | |
| Surfactant 2 | 0.80 | 0.80 | 0.80 | 0.80 | 0.80 | 0.80 | 0.80 | | | | 0.80 |
| Surfactant 3 | | | | | | | | | 0.80 | | |
| Surfactant 4 | | | | | | | | | | | |
| Surfactant 5 | 0.08 | 0.08 | 0.08 | 0.08 | 0.08 | 0.08 | 0.08 | 0.08 | 0.08 | | 0.08 |
| Surfactant 6 | | | | | | | | | | 0.05 | |
| Surfactant 7 | | | | | | | | | | | |
| Surfactant 8 | | | | | | | | | | | |
| Surfactant 9 | | | | | | | | | | | |
| Surfactant 10 | 0.20 | 0.20 | 0.20 | 0.20 | 0.20 | 0.20 | 0.20 | 0.20 | 0.20 | 0.20 | 0.20 |
| Surfactant 11 | | | | | | | | | | | |
| Surfactant 12 | | | | | | | | | | | |
| Surfactant 13 | | | | | | | | | | | |
| Proxel GXL | 0.20 | 0.20 | 0.20 | 0.20 | 0.20 | 0.20 | 0.20 | 0.20 | 0.20 | 0.20 | 0.20 |
| Water | 48.62 | 48.62 | 48.62 | 48.62 | 48.62 | 48.62 | 48.62 | 48.62 | 48.62 | 48.65 | 50.62 |
| $\gamma 10$ (mN/m) | 35 | 35 | 35 | 35 | 35 | 35 | 35 | 39 | 35 | 38 | 35 |
| $\gamma$ (mN/m) | 27 | 27 | 27 | 27 | 27 | 27 | 27 | 27 | 27 | 26 | 27 |
| Content F (%) | 0.08 | 0.08 | 0.08 | 0.08 | 0.08 | 0.08 | 0.08 | 0.08 | 0.08 | 0.05 | 0.08 |
| Content S (%) | 10.00 | 10.00 | 10.00 | 10.00 | 10.00 | 10.00 | 10.00 | 10.00 | 10.00 | 10.00 | 8.00 |
| S/F value | 125 | 125 | 125 | 125 | 125 | 125 | 125 | 125 | 125 | 200 | 100 |

TABLE 3-continued

Constitution and characteristics of ink

| | Example | | | | | | | | | | |
|---|---|---|---|---|---|---|---|---|---|---|---|
| | 12 | 13 | 14 | 15 | 16 | 17 | 18 | 19 | 20 | 21 | 22 |
| Pigment dispersion liquid number | 1 | 1 | 1 | 1 | 1 | 1 | 8 | 9 | 10 | 11 | 1 |
| Pigment dispersion liquid | 30.00 | 30.00 | 30.00 | 30.00 | 30.00 | 30.00 | 30.00 | 30.00 | 30.00 | 30.00 | 30.00 |
| Glycerol (42.3) | 5.00 | 5.00 | 5.00 | 5.00 | 10.00 | 10.00 | 5.00 | 5.00 | 5.00 | 5.00 | 5.00 |
| Triethanolamine (31.9) | 0.10 | 0.10 | 0.10 | 0.10 | 0.10 | 0.10 | 0.10 | 0.10 | 0.10 | 0.10 | 0.10 |
| 1,4-Butanediol (31.1) | | | | | | | | | | | |
| 1,3-Butanediol (30.0) | | | | | 6.00 | | | | | | |
| 2-Pyrrolidone (28.0) | 5.00 | 5.00 | 5.00 | 3.00 | | 5.00 | 5.00 | 5.00 | 5.00 | 5.00 | 5.00 |
| Triethylene glycol (22.7) | 5.00 | 5.00 | 7.00 | 3.00 | | 1.00 | 5.00 | 5.00 | 5.00 | 5.00 | 5.00 |
| Isopropyl alcohol (18.3) | | | | | | | | | | | |
| 1,2-Hexanediol (14.8) | 5.00 | 5.00 | 5.00 | 5.00 | 5.00 | 5.00 | 5.00 | 5.00 | 5.00 | 5.00 | 5.00 |
| Surfactant 1 | | | | | | | | | | | |
| Surfactant 2 | 0.80 | 0.25 | 0.80 | 0.80 | 0.80 | 0.80 | 0.80 | 0.80 | 0.80 | 0.80 | 1.00 |
| Surfactant 3 | | | | | | | | | | | |
| Surfactant 4 | | | | | | | | | | | |
| Surfactant 5 | 0.05 | 0.08 | 0.10 | 0.04 | 0.03 | 0.03 | 0.08 | 0.08 | 0.08 | 0.08 | 0.08 |
| Surfactant 6 | | | | | | | | | | | |
| Surfactant 7 | | | | | | | | | | | |
| Surfactant 8 | | | | | | | | | | | |
| Surfactant 9 | | | | | | | | | | | |
| Surfactant 10 | 0.20 | 0.20 | 0.20 | 0.20 | 0.20 | 0.20 | 0.20 | 0.20 | 0.20 | 0.20 | |
| Surfactant 11 | | | | | | | | | | | |
| Surfactant 12 | | | | | | | | | | | |
| Surfactant 13 | | | | | | | | | | | |
| Proxel GXL | 0.20 | 0.20 | 0.20 | 0.20 | 0.20 | 0.20 | 0.20 | 0.20 | 0.20 | 0.20 | 0.20 |
| Water | 48.65 | 49.17 | 46.60 | 52.66 | 47.67 | 47.67 | 48.62 | 48.62 | 48.62 | 48.62 | 48.62 |
| γ10 (mN/m) | 36 | 40 | 34 | 36 | 37 | 37 | 35 | 35 | 35 | 35 | 35 |
| γ (mN/m) | 29 | 27 | 25 | 30 | 31 | 31 | 27 | 27 | 27 | 27 | 27 |
| Content F (%) | 0.05 | 0.08 | 0.10 | 0.04 | 0.03 | 0.03 | 0.08 | 0.08 | 0.08 | 0.08 | 0.08 |
| Content S (%) | 10.00 | 10.00 | 12.00 | 6.00 | 6.00 | 6.00 | 10.00 | 10.00 | 10.00 | 10.00 | 10.00 |
| S/F value | 200 | 125 | 120 | 150 | 200 | 200 | 125 | 125 | 125 | 125 | 125 |

| | Example | | | | | | | | | Comparative Example | |
|---|---|---|---|---|---|---|---|---|---|---|---|
| | 23 | 24 | 25 | 26 | 27 | 28 | 29 | 30 | 31 | 1 | 2 |
| Pigment dispersion liquid number | 1 | 1 | 1 | 1 | 1 | 1 | 1 | 8 | 11 | 12 | 1 |
| Pigment dispersion liquid | 30.00 | 30.00 | 30.00 | 30.00 | 30.00 | 30.00 | 30.00 | 30.00 | 30.00 | 30.00 | 30.00 |
| Glycerol (42.3) | 5.00 | 5.00 | 5.00 | 5.00 | 5.00 | 5.00 | 5.00 | 5.00 | 5.00 | 5.00 | 5.00 |
| Triethanolamine (31.9) | 0.10 | 0.10 | 0.10 | 0.10 | 0.10 | 0.10 | 0.10 | 0.10 | 0.10 | 0.10 | 0.10 |
| 1,4-Butanediol (31.1) | | | | | | | | | | | |
| 1,3-Butanediol (30.0) | | | | | | | | | | | |
| 2-Pyrrolidone (28.0) | 5.00 | 5.00 | 5.00 | 5.00 | 5.00 | 5.00 | 5.00 | 5.00 | 5.00 | 5.00 | 5.00 |
| Triethylene glycol (22.7) | 5.00 | 5.00 | 5.00 | 5.00 | 5.00 | 5.00 | 5.00 | 1.00 | 1.00 | 5.00 | 5.00 |
| Isopropyl alcohol (18.3) | | | | | | | | | | | |
| 1,2-Hexanediol (14.8) | 5.00 | 5.00 | 5.00 | 5.00 | 5.00 | 5.00 | 5.00 | 5.00 | 5.00 | 5.00 | 5.00 |
| Surfactant 1 | | | | | | | | | | | |
| Surfactant 2 | 0.80 | 0.80 | 1.00 | 1.00 | 0.80 | 0.80 | 1.00 | 1.00 | 1.00 | 0.80 | |
| Surfactant 3 | | | | | | | | | | | |
| Surfactant 4 | | | | | | | | | | | |
| Surfactant 5 | 0.08 | 0.08 | 0.08 | 0.08 | 0.08 | 0.08 | 0.08 | 0.03 | 0.03 | 0.08 | 0.08 |
| Surfactant 6 | | | | | | | | | | | |
| Surfactant 7 | | | | | | | | | | | |
| Surfactant 8 | | | | | | | | | | | |
| Surfactant 9 | | | | | | | | | | | |
| Surfactant 10 | | | | 0.05 | 0.10 | 1.00 | 1.20 | | | 0.20 | 0.20 |
| Surfactant 11 | | 0.20 | | | | | | | | | |
| Surfactant 12 | 0.20 | | | | | | | | | | |
| Surfactant 13 | | | 0.20 | | | | | | | | |
| Proxel GXL | 0.20 | 0.20 | 0.20 | 0.20 | 0.20 | 0.20 | 0.20 | 0.20 | 0.20 | 0.20 | 0.20 |
| Water | 48.62 | 48.62 | 48.42 | 48.57 | 48.72 | 47.82 | 47.42 | 52.67 | 52.67 | 48.62 | 49.42 |
| γ10 (mN/m) | 35 | 35 | 35 | 35 | 35 | 35 | 35 | 37 | 37 | 35 | 42 |
| γ (mN/m) | 27 | 27 | 27 | 27 | 27 | 27 | 27 | 31 | 31 | 27 | 25 |
| Content F (%) | 0.08 | 0.08 | 0.08 | 0.08 | 0.08 | 0.08 | 0.08 | 0.03 | 0.03 | 0.08 | 0.08 |
| Content S (%) | 10.00 | 10.00 | 10.00 | 10.00 | 10.00 | 10.00 | 10.00 | 6.00 | 6.00 | 10.00 | 10.00 |
| S/F value | 125 | 125 | 125 | 125 | 125 | 125 | 125 | 200 | 200 | 125 | 125 |

TABLE 3-continued

Constitution and characteristics of ink

| | Comparative Example | | | | | | | | | | |
|---|---|---|---|---|---|---|---|---|---|---|---|
| | 3 | 4 | 5 | 6 | 7 | 8 | 9 | 10 | 11 | 12 | 13 |
| Pigment dispersion liquid number | 1 | 1 | 1 | 1 | 1 | 1 | 1 | 1 | 1 | 1 | 1 |
| Pigment dispersion liquid | 30.00 | 30.00 | 30.00 | 30.00 | 30.00 | 30.00 | 30.00 | 30.00 | 30.00 | 30.00 | 30.00 |
| Glycerol (42.3) | 5.00 | 5.00 | 5.00 | 5.00 | 5.00 | 10.00 | 10.00 | 10.00 | 5.00 | 5.00 | |
| Triethanolamine (31.9) | 0.10 | 0.10 | 0.10 | 0.10 | 0.10 | 0.10 | 0.10 | 0.10 | 0.10 | 0.10 | 0.10 |
| 1,4-Butanediol (31.1) | | | | | | 6.00 | | | | | |
| 1,3-Butanediol (30.0) | | | | | | | | | | | |
| 2-Pyrrolidone (28.0) | 5.00 | 5.00 | 5.00 | 5.00 | 5.00 | | | | 10.00 | 5.00 | 10.00 |
| Triethylene glycol (22.7) | 5.00 | 5.00 | 5.00 | 7.00 | 7.00 | | | 5.00 | 5.00 | 5.00 | 10.00 |
| Isopropyl alcohol (18.3) | | | | | | | 6.00 | | | | |
| 1,2-Hexanediol (14.8) | 5.00 | 5.00 | 5.00 | 5.00 | 5.00 | 5.00 | 5.00 | 5.00 | 5.00 | 5.00 | 5.00 |
| Surfactant 1 | | | | | | | | | | | |
| Surfactant 2 | | 0.50 | 0.50 | 0.80 | 0.80 | 0.80 | 0.80 | 0.80 | 0.80 | 0.10 | |
| Surfactant 3 | | | | | | | | | | | 0.50 |
| Surfactant 4 | 0.50 | | 0.50 | | | | | | | | |
| Surfactant 5 | 0.08 | | | | | 0.03 | 0.03 | 0.10 | 0.05 | 0.08 | 0.16 |
| Surfactant 6 | | | | | | | | | | | |
| Surfactant 7 | | | | 0.10 | | | | | | | |
| Surfactant 8 | | | | | 0.10 | | | | | | |
| Surfactant 9 | | 0.50 | | | | | | | | | |
| Surfactant 10 | 0.20 | 0.20 | 0.20 | | 0.20 | 0.20 | 0.20 | 0.20 | 0.20 | 0.20 | 0.20 |
| Surfactant 11 | | | | | | | | | | | |
| Surfactant 12 | | | | | | | | | | | |
| Surfactant 13 | | | | | | | | | | | |
| Proxel GXL | 0.20 | 0.20 | 0.20 | 0.20 | 0.20 | 0.20 | 0.20 | 0.20 | 0.20 | 0.20 | 0.20 |
| Water | 48.92 | 48.50 | 48.50 | 46.80 | 46.60 | 47.67 | 47.67 | 48.60 | 43.65 | 49.32 | 43.84 |
| γ10 (mN/m) | 32 | 35 | 37 | 38 | 35 | 37 | 37 | 35 | 35 | 41 | 30 |
| γ (mN/m) | 25 | 30 | 31 | 29 | 25 | 31 | 31 | 27 | 27 | 25 | 22 |
| Content F (%) | 0.08 | 0.00 | 0.00 | 0.10 | 0.10 | 0.03 | 0.03 | 0.10 | 0.05 | 0.08 | 0.16 |
| Content S (%) | 10.00 | 10.00 | 10.00 | 12.00 | 12.00 | 0.00 | 0.00 | 5.00 | 15.00 | 10.00 | 20.00 |
| S/F value | 125 | — | — | — | — | 0 | 0 | 50 | 300 | 125 | 125 |

Comparative Example 14

"Y-19" ink described in Japanese Patent Application Laid-Open No. 2012-184376 was prepared. The constitution of the prepared ink is shown below. The ink had a dynamic surface tension $\gamma_{10}$ of 37 mN/m, a static surface tension γ of 30 mN/m, and an S/F value of 500. MEGAFACE F-477 has a perfluoroalkyl group with more than six carbon atoms.

C.I. Pigment Yellow 155: 3.00%
Resin dispersant (trade name "DISPERBYK-190", manufactured by BYK-Chemie Co.): 1.60% (solid content)
2-Pyrrolidone: 10.00%
1,2-Hexanediol: 7.00%
Triethylene glycol monobutyl ether: 0.60%
Dipropylene glycol monopropyl ether: 5.00%
Dipropylene glycol monomethyl ether: 10.00%
Olfine E1010: 1.00% (an acetyleneglycol ethylene oxide adduct, manufactured by Nissin Chemical Industry Co., HLB13)
MEGAFACE F-477: 0.02% (an oligomer containing a fluorinated group, hydrophilic group, lipophilic group, manufactured by DIC Co.)
Additive resin: 5.00% (solid content) (a butyl methacrylate/acrylic acid copolymer)
Water: 56.78%

Comparative Example 15

"Cyan ink C10" described in Japanese Patent Application Laid-Open No. 2012-224658 was prepared. The constitution of the prepared ink is shown below. The ink had a dynamic surface tension $\gamma_{10}$ of 41 mN/m and a static surface tension γ of 30 mN/m.

C.I. Pigment Blue 15:3: 4.00%
Resin dispersant (Flowlen TG-750W, manufactured by Evonik Degussa Co.): 2.10%
2-Pyrrolidone: 5.00%
Triethylene glycol monobutyl ether: 0.80%
Dipropylene glycol monopropyl ether: 5.00%
BYK DYNWET 800: 1.00% (a polyoxyethylene alkyl ether type surfactant, manufactured by BYK-Chemie Co.)
MEGAFACE F-410: 0.05% (a perfluoroalkyl carboxylate, manufactured by DIC Co.)
Fixing resin: 5.00% (solid content) (a methyl methacrylate/2-ethylhexyl acrylate/methacrylic acid copolymer)
Water: 77.05%

Comparative Example 16

"Cyan ink C2" described in Japanese Patent Application Laid-Open No. 2012-224658 was prepared. The constitution of the prepared ink is shown below. The ink had a dynamic surface tension $\gamma_{10}$ of 45 mN/m, a static surface tension γ of 32 mN/m, and an S/F value of 625.

C.I. Pigment Blue 15:3: 4.00%
Resin dispersant (Flowlen TG-750W, manufactured by Evonik Degussa Co.): 2.10%
2-Pyrrolidone: 5.00%
Triethylene glycol monobutyl ether: 0.80%
Dipropylene glycol monomethyl ether: 5.00%
Novec 4432: 0.008% (a nonionic fluorinated surfactant, manufactured by Sumitomo 3M Co.)
Fixing resin: 5.00% (solid content) (a methyl methacrylate/2-ethylhexyl acrylate/methacrylic acid copolymer)
Water: 78.092%

Comparative Example 17

"Ink 4" described in Japanese Patent Application Laid-Open No. 2014-025055 was prepared. The constitution of the prepared ink is shown below. The ink had a dynamic surface tension $\gamma_{10}$ of 55 mN/m, a static surface tension $\gamma$ of 21 mN/m, and an S/F value of 19.
  C.I. Pigment Red 122: 3.00%
  Resin dispersant: 1.20% (a styrene/n-butyl acrylate/acrylic acid copolymer)
  Glycerol: 5.00%
  2-Pyrrolidone: 5.00%
  Polyethylene glycol (with a number average molecular weight of 600): 4.00%
  MEGAFACE F-440: 0.27% (a perfluoroalkyl ethylene oxide adduct, manufactured by DIC Co., fluorine addition carbon number: 6)
  Potassium phthalate: 1.00%
  Water: 80.53%

Comparative Example 18

"Ink 12" described in Japanese Patent Application Laid-Open No. 2014-025055 was prepared. The constitution of the prepared ink is shown below. The ink had a dynamic surface tension $\gamma_{10}$ of 40 mN/m, a static surface tension $\gamma$ of 26 mN/m, and an S/F value of 67.
  C.I. Pigment Red 122: 3.00%
  Resin dispersant: 1.20% (a styrene/n-butyl acrylate/acrylic acid copolymer)
  Glycerol: 5.00%
  2-Pyrrolidone: 5.00%
  Polyethylene glycol (with a number average molecular weight of 600): 4.00%
  MEGAFACE F-440: 0.075% (a perfluoroalkyl ethylene oxide adduct, manufactured by DIC Co., fluorine addition carbon number: 6)
  Potassium phthalate: 1.00%
  Water: 80.725%

Comparative Example 19

The ink of "Example 1" described in Japanese Patent Application Laid-Open No. 2010-275377 was prepared. The constitution of the prepared ink is shown below. The ink had a dynamic surface tension $\gamma_{10}$ of 30 mN/m, a static surface tension $\gamma$ of 25 mN/m, and an S/F value of 170.
  Resin-dispersed pigment: 10.73% (solid content)
  Glycerol: 17.00%
  3-Methyl-1,3-butanediol: 17.00%
  2-Ethyl-1,3-hexanediol: 2.00%
  2,4,7,9-Tetramethyldodecane-4,7-diol: 0.40%
  FS-3100: 0.10% (a perfluoroalkyl ethylene oxide adduct, manufactured by Du Pont Co., fluorine addition carbon number: 6)
  Proxel GXL (an antiseptic agent, manufactured by Arch Chemicals Co.): 0.05%
  pH adjuster (2-amino-2-methyl-1,3-propanediol): 0.30%
  Water: 52.42%
  Evaluation An ink jet recording apparatus equipped with a recording head that ejects inks by thermal energy (trade name "PIXUS Pro 9500", manufactured by Canon Co.) was used, and the following evaluations were carried out. With the ink jet recording apparatus, the image recorded under conditions in which eight ink droplets each having a weight of 3.5 ng are applied to a unit area of 1/600 inch×1/600 inch at a resolution of 600 dpi×600 dpi is defined as a recording duty of 100%. Each ink prepared was used, and fifteen solid images were recorded on each of four types of glossy papers at a recording duty ranging from 10 to 150% with an increment of 10% in an eight-pass manner. As the four types of glossy papers, commercial products available under the trade names "PT-101", "PT-201", and "GL-101" (manufactured by Canon Co.) and "CRISPIA" (manufactured by Epson Co.) were used. In the present invention, a sample evaluated as "AA", "A", or "B" was regarded as an acceptable level, and a sample evaluated as "C" was regarded as an unacceptable level based on the following criteria. The evaluation results are shown in Table 4.

Gloss Clarity

Solid images at a recording duty of 100% were evaluated in the following manner. Two fluorescent lights disposed at an interval of 10 cm were used as observation light sources and were projected on the image 2 m apart. The shapes of the fluorescent lights projected on the image were visually observed under conditions of a lighting angle of 45 degrees and an observation angle of 45 degrees, and the gloss clarity of the image was evaluated based on the following criteria. Of the evaluations of the solid images recorded on the four types of glossy papers, the lowest evaluation was regarded as the evaluation result.

AA: The boundary between two projected fluorescent lights could be recognized, and the edges were not blurred.
A: The boundary between two projected fluorescent lights and the edges could be recognized, but the edges were slightly blurred.
B: The boundary between two projected fluorescent lights could be recognized, but the edges were so blurred as not to be recognized.
C: The boundary between two projected fluorescent lights could not be recognized.

Gloss Unevenness

Solid images at recording duties of 30%, 50%, and 100% were visually observed, and the gloss unevenness was evaluated based on the following criteria. Of the evaluations of the solid images recorded on the four types of glossy papers, the lowest evaluation was regarded as the evaluation result.

AA: Each solid image had no difference in glossiness, and no gloss unevenness was caused.
A: A slight difference in glossiness was observed between solid images at 30% and 100%, and a small gloss unevenness was caused.
B: A slight difference in glossiness was observed between solid image at 50% and 100%, and a small gloss unevenness was caused.
C: An obvious difference in glossiness was observed between solid images at 50% and 100%, and a marked gloss unevenness was caused.

TABLE 4

| | | Evaluation result | |
|---|---|---|---|
| | | Gloss clarity | Gloss unevenness |
| Example | 1 | AA | AA |
| | 2 | AA | AA |
| | 3 | AA | AA |
| | 4 | AA | AA |
| | 5 | AA | AA |
| | 6 | AA | AA |
| | 7 | AA | AA |

TABLE 4-continued

| | | Evaluation result | |
|---|---|---|---|
| | | Gloss clarity | Gloss unevenness |
| | 8 | AA | AA |
| | 9 | AA | AA |
| | 10 | AA | AA |
| | 11 | AA | AA |
| | 12 | AA | AA |
| | 13 | AA | AA |
| | 14 | AA | AA |
| | 15 | AA | AA |
| | 16 | A | AA |
| | 17 | A | AA |
| | 18 | A | AA |
| | 19 | AA | AA |
| | 20 | AA | AA |
| | 21 | AA | A |
| | 22 | AA | A |
| | 23 | AA | AA |
| | 24 | AA | AA |
| | 25 | AA | A |
| | 26 | AA | A |
| | 27 | AA | AA |
| | 28 | AA | AA |
| | 29 | A | AA |
| | 30 | B | A |
| | 31 | A | B |
| Comparative Example | 1 | C | AA |
| | 2 | C | AA |
| | 3 | AA | C |
| | 4 | AA | C |
| | 5 | A | C |
| | 6 | AA | C |
| | 7 | AA | C |
| | 8 | A | C |
| | 9 | A | C |
| | 10 | AA | C |
| | 11 | C | AA |
| | 12 | C | AA |
| | 13 | C | AA |
| | 14 | AA | C |
| | 15 | C | AA |
| | 16 | C | AA |
| | 17 | C | AA |
| | 18 | AA | C |
| | 19 | A | C |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-011094, filed Jan. 23, 2015, which is hereby incorporated by reference herein in its entirety.

What is claimed is:

1. An aqueous ink for ink jet comprising:
a pigment;
a water-soluble resin for dispersing the pigment;
a water-soluble organic solvent having a dielectric constant at 25° C. of 20.0 or more to 30.0 or less;
an acetylene glycol type surfactant; and
a fluorinated surfactant,
wherein the acetylene glycol type surfactant comprises an acetylene glycol ethylene oxide adduct having an HLB value determined by Griffin's method of 10 or more,
wherein the fluorinated surfactant comprises a perfluoroalkyl ethylene oxide adduct having a perfluoroalkyl group with six or less carbon atoms,
wherein a content (% by mass) of the fluorinated surfactant in the ink is 0.01% by mass or more to 0.08% by mass or less based on the total mass of the ink,
wherein a content (% by mass) of the water-soluble organic solvent relative to a content (% by mass) of the fluorinated surfactant based on the total mass of the ink is 100 times or more to 200 times or less in terms of mass ratio, and
wherein the aqueous ink has a dynamic surface tension $\gamma_{10}$ at a lifetime of 10 ms of 40 mN/m or less and a static surface tension $\gamma$ of 25 mN/m or more.

2. The aqueous ink according to claim 1, having a static surface tension $\gamma$ of 30 mN/m or less.

3. The aqueous ink according to claim 1, wherein a content (% by mass) of the pigment relative to a content (% by mass) of the water-soluble resin based on the total mass of the ink is 1.0 times or more to 10.0 times or less in terms of mass ratio.

4. The aqueous ink according to claim 1, further comprising a polyoxyethylene alkyl ether having an HLB value determined by Griffin's method of 15 or more in an amount of 0.10% by mass or more to 1.00% by mass or less based on the total mass of the ink.

5. The aqueous ink according to claim 1, wherein the water-soluble resin comprises a water-soluble acrylic resin.

6. The aqueous ink according to claim 5, wherein the water-soluble acrylic resin has (i) a unit derived from (meth)acrylic acid and (ii) at least one of a unit derived from a monomer having an aliphatic group and a unit derived from a monomer having an aromatic ring.

7. An ink cartridge comprising:
an ink; and
an ink storage portion for storing the ink,
wherein the ink comprises the ink according to claim 1.

8. An ink jet recording method comprising:
ejecting an ink from an ink jet recording head to record an image on a recording medium,
wherein the ink comprises the ink according to claim 1.

9. The ink jet recording method according to claim 8, wherein the recording medium is a paper having permeability.

10. The ink jet recording method according to claim 9, wherein the recording medium has a coating layer.

11. The ink jet recording method according to claim 10, wherein the coating layer has a glossy surface.

12. The aqueous ink according to claim 1, wherein the content (% by mass) of the pigment in the ink is 0.05% by mass or more to 15.00% by mass or less based on the total mass of the ink.

13. The aqueous ink according to claim 1, wherein the content (% by mass) of the water-soluble resin is 0.01% by mass or more to 5.00% by mass or less based on the total mass of the ink.

14. The aqueous ink according to claim 1, wherein the content (% by mass) of the water-soluble organic solvent in the ink is 3.00% by mass or more to 20.00% by mass or less based on the total mass of the ink.

15. The aqueous ink according to claim 1, wherein the content (% by mass) of the acetylene glycol type surfactant in the ink is 0.10% by mass or more to 1.00% by mass or less based on the total mass of the ink.

16. The aqueous ink according to claim 1, wherein the content (% by mass) of the fluorinated surfactant in the ink is 0.01% by mass or more to 0.20% by mass or less based on the total mass of the ink.

17. The aqueous ink according to claim 1, wherein the fluorinated surfactant comprises a linear perfluoroalkyl ethylene oxide adduct.

18. The aqueous ink according to claim 1, wherein the content (% by mass) of the fluorinated surfactant in the ink is 0.03% by mass or more to 0.08% by mass or less based on the total mass of the ink.

* * * * *